(12) United States Patent
Tse et al.

(10) Patent No.: US 7,672,023 B2
(45) Date of Patent: Mar. 2, 2010

(54) DOCUMENT HANDLER SYSTEMS AND METHODS

(75) Inventors: Francis K. Tse, Rochester, NY (US); John C. Cassidy, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 1112 days.

(21) Appl. No.: 11/302,845

(22) Filed: Dec. 14, 2005

(65) Prior Publication Data

US 2007/0134037 A1   Jun. 14, 2007

(51) Int. Cl.
*H04N 1/04* (2006.01)
(52) U.S. Cl. .................. 358/474; 358/496; 358/497; 358/498
(58) Field of Classification Search .................. 358/474, 358/496, 497, 498, 488
See application file for complete search history.

(56) References Cited

U.S. PATENT DOCUMENTS

| | | | |
|---|---|---|---|
| 4,314,159 A | 2/1982 | Davis | |
| 5,119,213 A | 6/1992 | Graves et al. | |
| 5,384,621 A | 1/1995 | Hatch et al. | |
| 5,513,017 A * | 4/1996 | Knodt et al. | 358/471 |
| 6,032,004 A | 2/2000 | Mirabella, Jr. et al. | |
| 6,646,768 B1 | 11/2003 | Andersen et al. | |
| 7,139,108 B2 * | 11/2006 | Andersen et al. | 358/474 |
| 2005/0146756 A1 | 7/2005 | Shimizu | |

* cited by examiner

*Primary Examiner*—Houshang Safaipour
(74) *Attorney, Agent, or Firm*—Gibb I.P. Law Firm, LLC

(57) ABSTRACT

Embodiments herein observe the backing of the document handler to determine if a document was left on the platen and would block the scan head from scanning the documents as they are moved by the document handler. An embodiment herein comprises a transparent platen and a document handler on a first side of the platen. The document handler has a backing, and the backing is adapted to move media within the document handler. A scan head is positioned on a second side of the platen. The scan head remains stationary when scanning the media being moved by the document handler and the scan head moves when scanning media on the platen. The backing of the document handler has a surface that is distinguishable from the media such that the scan head can detect whether the media is on the platen and would block the scan head from scanning the media being moved by the document handler.

16 Claims, 4 Drawing Sheets

DOCUMENT HANDLER SYSTEMS AND METHODS

BACKGROUND

Embodiments herein generally relate to copiers/printers that use document handlers and more particularly to a system and method that determines if a document was left on the platen.

To reduce cost, multi-function printers (MFPs) use part of the platen scan area for document handler (DH) scans. Because of that, a document left on the platen could block the scanning of documents scanned with the DH. To avoid originals being left on the platen, and thus blocking the DH scan window, software (SW) could be used to detect if the DH has been lifted after a platen scanning occurred. However, this does not protect the cases where the user lifted the DH but did still did not remove the original, or if an original was placed or left on the platen while the machine was off, etc. Since there are no image preview function on the low cost devices, defective scans can go unnoticed for a long time, causing major loss.

SUMMARY

Embodiments herein observe the backing of the document handler to determine if a document was left on the platen and would block the scan head from scanning the documents as they are moved by the document handler. An apparatus embodiment herein comprises a transparent platen and a document handler on a first side of the platen. The document handler has a backing, and the backing is adapted to move media within the document handler. A scan head is positioned on a second side of the platen. The scan head remains stationary when scanning the media being moved by the document handler, while the scan head moves when scanning media on the platen. The backing of the document handler has a surface that is distinguishable from the media such that the scan head can detect whether the media is on the platen and would block the scan head from scanning the media being moved by the document handler.

In one embodiment, the surface of the backing has markings thereon. For example, the markings can be in a predetermined pattern, color, etc. and the scan head can be adapted to identify the predetermined pattern, color, etc. Alternatively, the reflectivity of the backing can be made sufficiently different from the reflectivity of the media to allow the scan head to distinguish between the backing and the media. Thus, the scan head detects whether the media is on the platen before documents are moved by the document handler.

In a method embodiment, if a platen operation is selected, the method moves the scan head by the platen to scan media on the opposite side of the platen. If a document handler operation is selected, the method first attempts to observe the backing of the document handler through the platen using the scan head. Again, the backing has a surface distinguishable from media moved by the document handler. If the scan head observes the backing, the method moves the media by the scan head using the document handler while the scan head is stationary, and scans the media as the media moves by the scan head. If the scan head does not observe the backing, the method provides an error notification, and prevents the document handler from moving the media.

When attempting to observe the backing, the method attempts to observe markings on the backing. Alternatively, when attempting to observe the backing, the method attempts to observe a difference between reflectivity of the backing and reflectivity of the media. If the scan head does not observe the backing, the media on the platen blocks the scan head from scanning media being moved by the document handler. Again, the method attempts to observe the backing before moving of the media by the scan head.

These and other features are described in, or are apparent from, the following detailed description.

BRIEF DESCRIPTION OF THE DRAWINGS

Various exemplary embodiments of the systems and methods are described in detail below, with reference to the attached drawing figures, in which.

DETAILED DESCRIPTION

Figure 5:
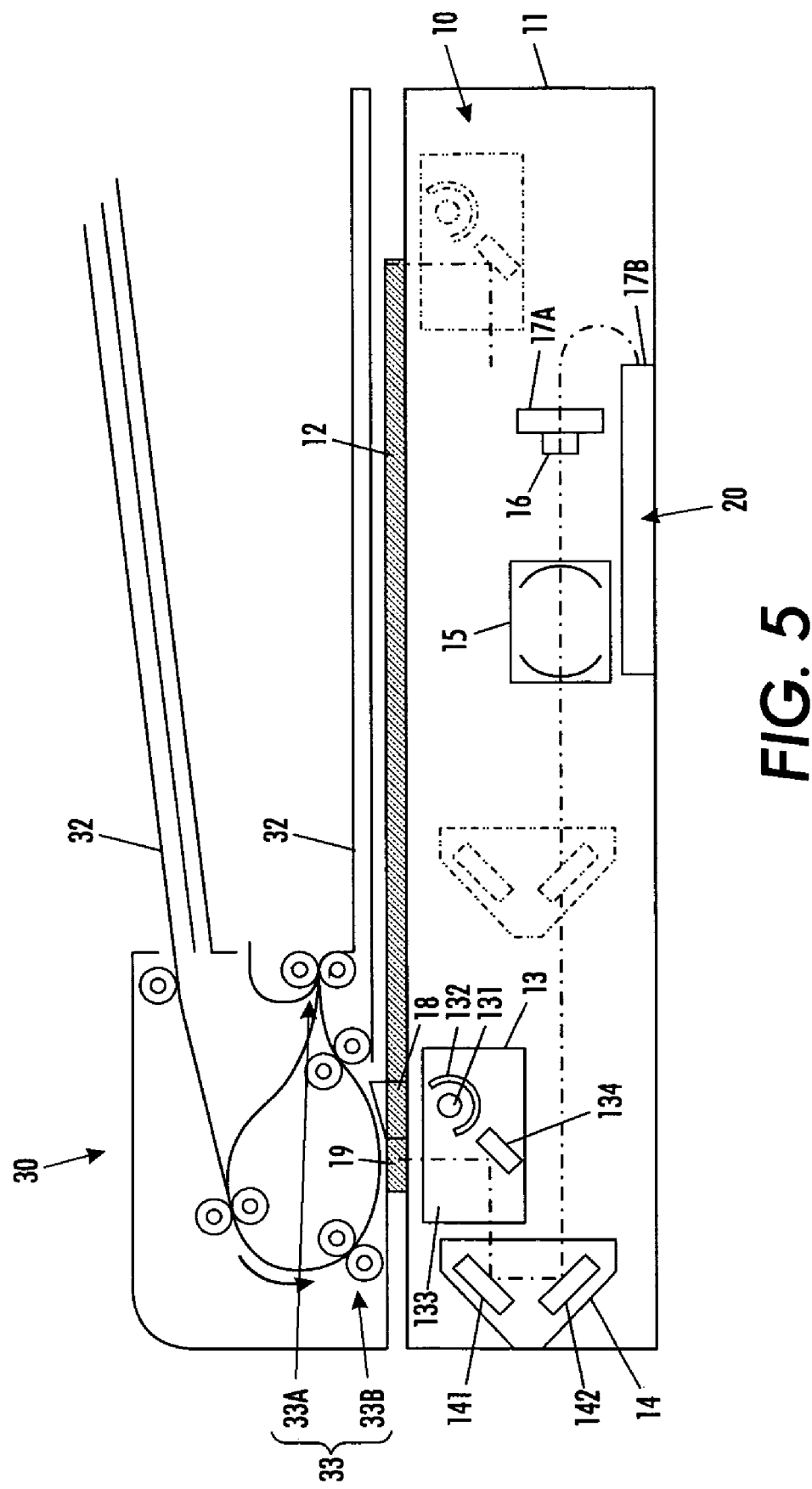
FIG. 5 is a schematic representation of a document handler positioned over the platen glass of a printer/copier.

An automatic document feeder is shown in FIG. 5 that is similar to an automatic document feeder disclosed in U.S. Patent Publication 2005/0146756, the complete disclosure of which is incorporated herein by reference. More specifically, FIG. 5 is a side sectional view showing the outline of the configuration of an image reading apparatus. As shown in FIG. 5, an image reading apparatus of this example includes a document reading section 10, an image processing section 20, and an ADF (Automatic Document Feeder) apparatus 30 functioning as a platen cover without a circulation function. This apparatus is used as an image reading apparatus of an image processing apparatus, for example, such as a scanner, a copier, a facsimile, or a multi-function device.

The document reading section 10 includes a housing 11, a platen glass (document mounting stand) 12, a full rate carriage 13, a half rate carriage 14, a lens 15, and a CCD sensor 16. The platen glass 12 is formed of transparent glass disposed on the housing 11. A sheet-type document to be read is mounted on the platen glass 12.

The full rate carriage 13, disposed below the platen glass 12 within the housing 11, includes: a light source 131 that applies light toward a face opposite to a document mounting face of the platen glass 12; a substantially concave reflector 132 and a reflection mirror 133 that reflect light emitted from the light source 131 to the platen glass 12; a reflection mirror 134 that changes an optical path of reflected light from the platen glass 12 in a direction substantially parallel to the platen glass 12. As the light source 131, a fluorescent lamp with a longitudinal direction as a fast-scanning direction (a direction orthogonal to paper surface) is used.

The half rate carriage 14 includes two reflection mirrors 141 and 142 disposed to form substantially a right angle, and successively changes optical paths of reflected light passing through the full rate carriage 13 by 90 degrees at a time. The full rate carriage 13 and the half rate carriage 14, driven by e.g., a stepping motor (not shown in the drawing), are configured to reciprocally travel in a slow-scanning direction (a direction indicated by the arrow X in the drawing) and a direction opposite to it in conjunction with each other.

The lens 15 gathers reflected light inputted from the platen glass 12 via the full rate carriage 13 and the half rate carriage 14 onto an imaging face of the CCD sensor 16, which is a solid-state image sensor. By receiving the reflected light gathered by the lens 15, the CCD sensor 16 senses the image of a document mounted on the platen glass 12 in the fast-scanning direction and successively outputs analog image signals corresponding to the density of the image (corresponding to the intensity of the reflected light).

As to the CCD sensor 16, if the image reading apparatus supports monochrome images, one line sensor is formed on a semiconductor board (not shown). If the image reading apparatus supports color images, three line sensors corresponding to the three colors, R (red), G (green), and B (blue) are formed on the semiconductor board at prescribed intervals so that the three light components can be detected. If the image reading apparatus supports monochrome and color images, one line sensor for monochrome images and three line sensors for the R, G, and B colors are formed on the semiconductor board at prescribed intervals.

The CCD sensor 16 is disposed on a board 17A together with a read signal processing section (not shown) including a drive control section such as a CCD driver for driving the CCD sensor 16. An analog video signal outputted from the CCD sensor 16, after being subjected to predetermined signal processing in the read signal processing section, is sent to the image processing section 20 disposed on an image processing board 17B.

The ADF apparatus 30 includes: a document setting section 31; a document discharging section 32; and pairs of various feeding rolls such as a pair of registration rolls 33A and a pair of exit rolls 33B for forming a document feeding path. A guide 18 is provided at a left edge of the drawing in the platen glass 12 above the housing 11. In the immediate neighborhood of the guide 18, a light-permeable contact glass 19 (readout glass) is disposed.

In the image reading apparatus configured as described above, the full rate carriage 13 of the document reading section 10 forming a readout optical system is usually in a home position. During feed reading in which an image of a document is read while the document is fed by the ADF apparatus 30, the full rate carriage 13 is fixed (locked for halt) in an arbitrary position below the contact glass 19, which is on a document feeding path of the ADF apparatus 30.

Specifically, the full rate carriage 13 moves or moves under exposure scanning in the direction opposite to the arrow X from the home position, and is locked for halt in a feed read image tip position. At this time, the CCD sensor 16 and the read signal processing section go into an imaging wait state. Thereafter, an exposure start permission signal is sent from a CPU of a main unit (not shown) to the ADF apparatus 30. Upon receiving the exposure start permission signal, the ADF apparatus 30 starts to feed a document set on the document setting section 31.

When the document is guided toward the guide 18 via the predetermined feeding paths (including the various pairs of feeding rolls 33) and the tip of the document reaches the feed read image tip position via the pair of registration rolls 33A, an image tip detection signal is sent from the ADF apparatus 30 to the document reading section 10, so that reading of the document image is started. The circumferential speeds of the pairs of feeding rolls 33 such as the pair of registration rolls 33A and the pair of exit rolls 33B are controlled to be constant, whereby the document passes on the contact glass 19 at a substantially constant speed and is discharged to the document discharging section 32 by the pair of exit rolls 33B.

By the abovementioned series of operations, in the image reading apparatus, image reading based on the so-called CVT (Constant Velocity Transfer) method is performed. According to this method, during feed reading, an image of a document to be read is read while the document is fed at a constant speed.

On the other hand, during stationary reading in which an image of a document is read with the document being mounted on the platen glass 12, the document is mounted on the platen glass 12 manually (or by the ADF apparatus 30) and fixed in an arbitrary position on the platen glass 12 so that the readout optical system including the full rate carriage 13 and the half rate carriage 14 is moved for scanning at a constant speed in the direction of the arrow X to read the document image.

Specifically, in the state in which the document mounted on the platen glass 12 is covered with the ADF apparatus 30, light from the light source 131 is applied on the document surface through the platen glass 12 and its reflected light is gathered on the imaging face of the CCD sensor 16 by the lens 15 after passing through the full rate carriage 13 and the half rate carriage 14. The CCD sensor 16 performs photoelectric conversion for the incident light on a pixel basis to read the document image by a prescribed resolution determined by the number of pixels and outputs an analog image signal. If the image reading apparatus supports color images, analog image signals of the R, G, and B color components are outputted from the CCD sensor 16.

During the reading, in order that irradiation light from the light source 131 is applied on the whole surface of the document and the CCD sensor 16 reads the whole input image through the readout optical system including the lens 15, the readout optical system including the full rate carriage 13 including the light source 131, the half rate carriage 14, or the lens 15, and the CCD sensor 16 move at a constant speed in the direction (slow-scanning direction) of the arrow X in FIG. 5.

By the abovementioned series of operations, in the image reading apparatus, during stationary reading, a document to be read is fixed on the platen glass 12, and the readout optical system including the full rate carriage 13 and the half rate carriage 14 is moved at a constant speed to read an image of the document.

Figure 1:
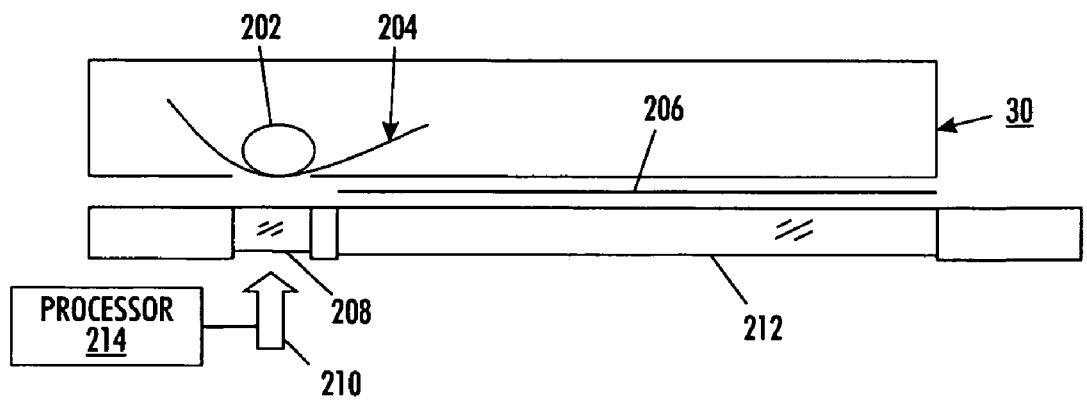
FIG. 1 is a schematic representation of a document handler positioned over the platen glass of a printer/copier.

FIG. 1 shows a more generic schematic diagram of a CVT scanning arrangement, where a separate scan window 208 and platen glass window 212 are used. In FIG. 1, the scan head, which represents, for example, the full rate carriage 13, and can in some embodiments include components of the half rate carriage 14, the lens 15, the CCD sensor 16, etc., is shown as item 210. The scan head 210 is connected directly or indirectly to any commonly available processor 214 capable of performing instructions, making comparisons, storing items in memory, executing software, etc. At many points herein, when the scan head 210 is referred to, this reference is intended to include any combination of the scan head 210 and the processor 214. The ADF 30 is referred to as a document handler 30 in FIGS. 1-3b. The backing 202 can be the surface of one of the rollers or part of the paper path 33, discussed above, or any other similar device, such as the different-colored backings of conveyor belts discussed in U.S. Pat. No. 6,744,536, the complete disclosure of which is incorporated herein by reference. A sheet of media 204 is shown being passed in front of the scan head 210.

Figure 2:
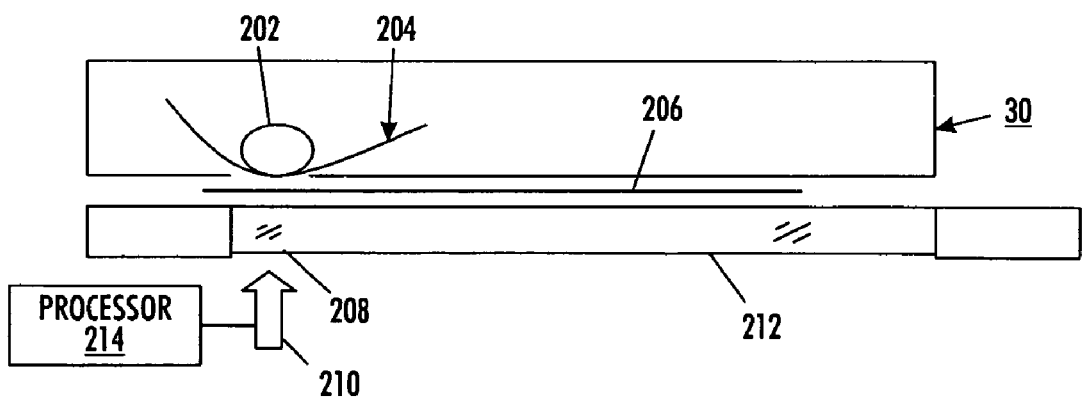
FIG. 2 is a schematic representation of a document handler positioned over the platen glass of a printer/copier.

With the arrangement shown in FIG. 1, any document 206 left on the platen glass window 208 from a previous scanning or copying usage will not block the separate CVT scan window 212. To reduce cost, the extra CVT window 208 can be eliminated, as shown in FIG. 2. However, with the structure shown in FIG. 2, documents 206 left on the platen glass 212 will block the view of the scan head 210 when it attempts to view the documents 204 being feed in front of the stationary scan head 210 by the CVT document handler 30. This will result in blank images being scanned. For copying, a user could get at direct feedback by inspecting the copy output. On the other hand, in the case of scanning images for export, a user would not know that images scanned are blank until much later.

To avoid originals being left on the platen, thus blocking the DH scan window, software could be used to detect if the DH 30 has been lifted after a platen scanning occurred. For example, U.S. Pat. No. 6,646,768, the complete disclosure of which is incorporated herein by reference, discloses a system that detects the opening of the glass plate cover to determine whether or not a document has been left on the glass plate after scanning. The same sensor is also utilized to detect the leading edge of an ADF fed document 204 to initiate the scanning process at the precise time the document reaches the ADF scan window. However, this structure does not protect the cases where the user lifts the DH 30 but does not remove the original 206, or, if an original 206 was placed or left on the platen 212 while the machine was off, etc. Since there are no image preview function on many low cost devices a document 206 left on the platen glass 212 can cause defective scans can go unnoticed for a long time causing major loss.

Figure 3A:
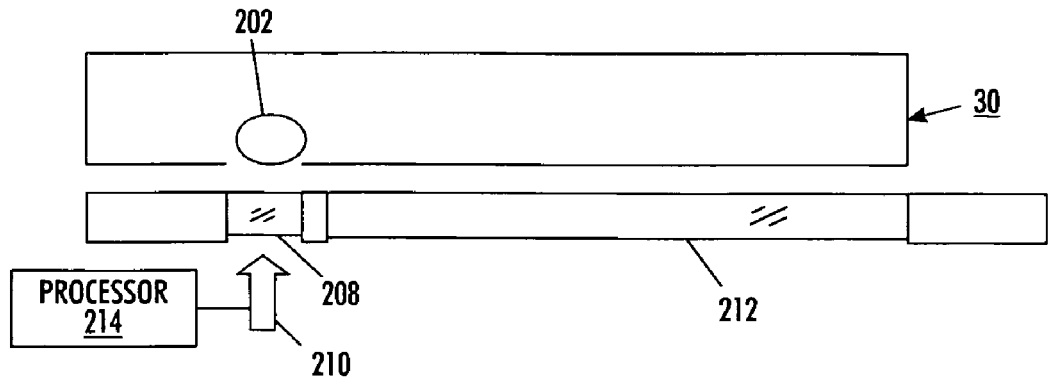
FIG. 3a is a schematic representation of a document handler positioned over the platen glass of a printer/copier.
Figure 3B:
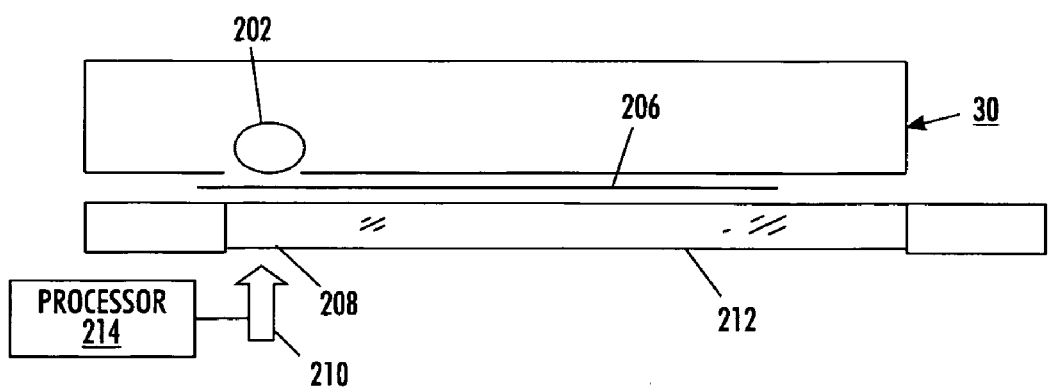
FIG. 3b is a schematic representation of a document handler positioned over the platen glass of a printer/copier.

To avoid the situation where the CVT scan window is blocked by a document 206 left on the platen, with embodiments herein the CVT scan backing 202 is "marked" with a pattern (including straight and/or curved lines, bar codes, regular and/or irregular shapes, etc.) that can be detected by the scan head 210 to verify that the CVT window is clear prior to actual feeding documents using the backing 202 or rollers of the paper path 33 of the ADF 30 for CVT scanning. Thus, embodiments herein observe the backing 202 of the document handler, using the scan head 210 as shown in FIG. 3a, to determine if a document 206 was left on the platen and would block the scan head 210 from scanning the documents as they are moved by the document handler, as shown in FIG. 3b.

Thus, an apparatus embodiment herein comprises a transparent platen 212 and a document handler 30 on a first side of the platen 212. The document handler 30 has a backing 202, and the backing 202 is adapted to move media 204 within the document handler 30. The scan head 210 is positioned on a second side of the platen 212. The scan head 210 remains stationary when scanning the media 204 being moved by the document handler 30 and the scan head 210 moves when scanning media 206 on the platen 212. The backing 202 of the document handler 30 has a surface that is distinguishable from the media 206 such that the scan head 210 can detect whether the media 206 is on the platen 212 and would block the scan head 210 from scanning the media 204 being moved by the document handler 30.

In one embodiment, the surface of the backing 202 has markings thereon and/or has a different color/reflectivity that is distinguishable from media 206 that would be scanned. For example, the markings can be in a predetermined unique pattern, color, etc that is not likely to randomly appear on an item to be scanned, and the scan head 210 (or processor/software in communication therewith) can be adapted to identify the predetermined pattern, color, etc. Alternatively, the reflectivity of the backing 202 can be made sufficiently different from the reflectivity of the media 206 to allow the scan head 210 to distinguish between the backing 202 and the media 206. Thus, the scan head 210 detects whether the media 206 is on the platen 212 before documents 204 are moved by the document handler 30.

The pattern can be as simple a set of tick marks on the CVT backing 202 or as complicated as bar codes, symbols that encode data, etc. To avoid potential show through of the markings in scanning, the markings can also be a varying light gray mark. In some embodiments the markings are limited to certain areas of the backing 202. In other embodiments, the markings extend across the whole backing 202 length, to make sure that the window is not even partially blocked.

The patterns can have a particular signature that the software looks for, or the markings can be dynamically recorded as part of the scanner power on calibration. Thus, in one embodiment when the scanner performs the power on calibration it observes the markings on the backing 202 and stores the observed markings for later comparison when the platen 212 is checked to see if the backing 202 can be viewed without being blocked by an errant remaining sheet 206.

Alternatively, if the reflectivity, color, etc. of the CVT backing 202 is sufficiently different from the reflectivity of a piece of paper, the embodiments herein detect the presence of a paper on the platen without the use of special markings on the CVT backing. Embodiments herein also detect the presence of a page on the platen by looking for the pattern produced when the scan head scans under the CVT backing and the associated opening in the CVT. A piece of paper produces a different pattern than the backing as either the backing has markings on it, or its reflectivity is sufficiently different from most media types that the scanner can tell what it is observing.

Figure 4:
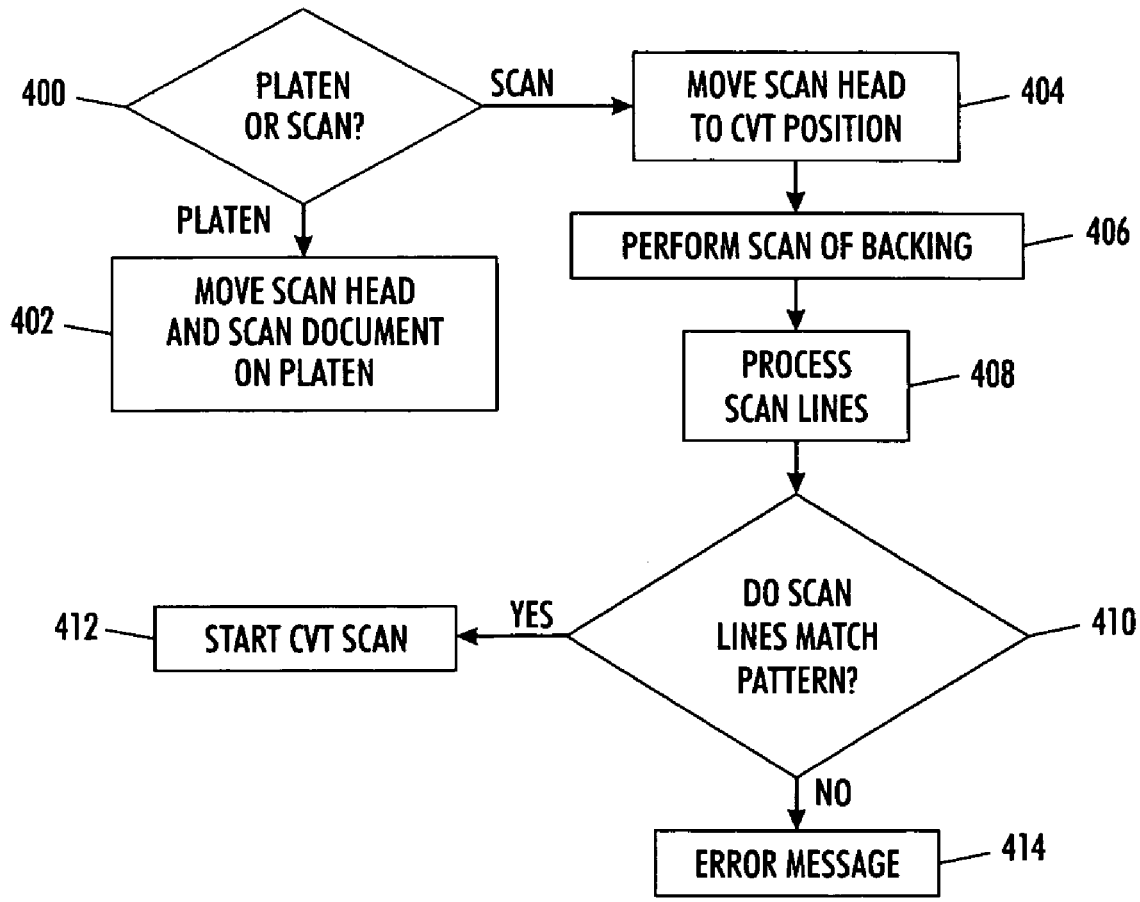
FIG. 4 is a flow diagram showing processing steps of embodiments herein.

One exemplary method for the detection of the remaining sheet 206 is shown in flowchart form in FIG. 4. Item 400 represents the user's decision to use the document handler or to manually place an item on the platen to be scanned. If the platen scanning is to be performed, in item 402, the method moves the scan head by the platen to scan the media on the opposite side of the platen.

If the document feeder/handler operation is selected, in item 404, on being instructed to make a CVT scan, the method moves the scan head 210 to the CVT scan position beneath the backing 202. Then, in item 406, the method turns on the lamp and acquires N number of scan lines. The scan lines can then be averaged and processed by, for example, subsampling, enhancing, thresholding at a set level, etc., as shown in item 408. The scan lines are then compared with expected pattern in item 410, which can use correlation or other comparison techniques. Depending upon whether the embodiment looks for a pattern, reflectivity, color or other characteristics, item 410 can represent many different comparisons which can be done exclusive of each other, or can be done in combination.

If the comparison in item 410 meets a particular threshold (meaning that the expected pattern is detected), the method start the CVT scan in item 412 by passing sheets of media in front of the scan head using the document feeder. Otherwise, in item 414, the method calls for a message to be provided to the user to lift the document handler and check for images on the platen or other obstruction of the CVT window. Thus, if the scan head does not observe the backing, in item 414 the method provides an error notification, and prevents the document handler from moving the media.

The word "printer" as used herein encompasses any apparatus, such as a digital copier, bookmaking machine, facsimile machine, multi-function machine, etc. which performs a print outputting function for any purpose. The details of printers, printing engines, etc. are well-known by those ordinarily skilled in the art and are discussed in, for example, U.S. Pat. No. 6,032,004, the complete disclosure of which is fully incorporated herein by reference. The following claims can encompass embodiments that print in monochrome, color, or handle color image data. All foregoing embodiments are specifically applicable to electrostatographic and/or xerographic machines and/or processes.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. The claims can encompass embodiments in hardware, software, and/or a combination thereof.

What is claimed is:

1. An apparatus comprising:
   a platen;
   a document handler on a first side of said platen, wherein said document handler comprises a backing, and wherein said backing is adapted to move media within said document handler; and
   a scan head on a second side of said platen,
   wherein said backing includes a surface distinguishable from said media such that said scan head can detect whether said media is on said platen,
   wherein said scan head is adapted to detect whether said media is on said platen before documents are moved by said document handler, and
   wherein a reflectivity of said backing is sufficiently different from a reflectivity of said media to allow said scan head to distinguish between said backing and said media.

2. The apparatus according to claim 1, wherein said surface of said backing comprises markings.

3. The apparatus according to claim 1, wherein said media on said platen blocks said scan head from scanning media being moved by said document handler.

4. An apparatus comprising:
   a platen;
   a document handler on a first side of said platen, wherein said document handler comprises a backing, and wherein said backing is adapted to move media within said document handler; and
   a scan head on a second side of said platen,
   wherein said backing includes a surface distinguishable from said media such that said scan head can detect whether said media is on said platen,
   wherein said scan head is adapted to detect whether said media is on said platen before documents are moved by said document handler, and
   wherein said scan head is adapted to detect whether said media is on said platen before documents are moved by said document handler, wherein said scan head is adapted to observe said surface of said backing when detecting whether said media is on said platen.

5. An apparatus comprising:
   a transparent platen;
   a document handler on a first side of said platen, wherein said document handler comprises a backing, and wherein said backing is adapted to move media within said document handler; and
   a scan head on a second side of said platen, wherein said scan head is adapted to remain stationary when scanning said media being moved by said document handler and said scan head is adapted to move when scanning media on said platen,
   wherein said backing includes a surface distinguishable from said media such that said scan head can detect whether said media is on said platen and would block said scan head from scanning said media being moved by said document handler,
   wherein said scan head is adapted to detect whether said media is on said platen before documents are moved by said document handler, and
   wherein a reflectivity of said backing is sufficiently different from a reflectivity of said media to allow said scan head to distinguish between said backing and said media.

6. The apparatus according to claim 5, wherein said surface of said backing comprises markings.

7. The apparatus according to claim 6, wherein said markings comprise a predetermined pattern, and wherein said scan head is adapted to identify said predetermined pattern.

8. An apparatus comprising:
   a transparent platen;
   a document handler on a first side of said platen, wherein said document handler comprises a backing, and wherein said backing is adapted to move media within said document handler; and
   a scan head on a second side of said platen, wherein said scan head is adapted to remain stationary when scanning said media being moved by said document handler and said scan head is adapted to move when scanning media on said platen,
   wherein said backing includes a surface distinguishable from said media such that said scan head can detect whether said media is on said platen and would block said scan head from scanning said media being moved by said document handler,
   wherein said scan head is adapted to detect whether said media is on said platen before documents are moved by said document handler, and
   wherein said scan head is adapted to detect whether said media is on said platen before documents are moved by said document handler, wherein said scan is adapted to observe said surface of said backing when detecting whether said media is on said platen.

9. A method comprising:
   attempting to observe a backing of a document handler through a platen using a scan head, wherein said backing includes a surface distinguishable from media moved by said document handler;
   if said scan head observes said backing:
     moving said media by said scan head using said document handler; and
     scanning said media as said media moves by said scan head; and
   if said scan head does not observe said backing:
     providing an error notification; and
     preventing said document handler from moving said media,
   wherein when attempting to observe said backing, said method further comprises attempting to observe a difference between reflectivity of said backing and reflectivity of said media.

10. The method according to claim 9, wherein when attempting to observe said backing, said method further comprises attempting to observe markings on said backing.

11. The method according to claim 9, wherein if said scan head does not observe said backing, said media on said platen blocks said scan head from scanning media being moved by said document handler.

12. The method according to claim 9, wherein said attempting to observe said backing is performed before said moving of said media by said scan head.

13. A method comprising:
- if a platen operation is selected, moving a scan head by a platen to scan media on an opposite side of a platen; and
- if a document handler operation is selected:
  - attempting to observe a backing of said document handler through said platen using said scan head, wherein said backing includes a surface distinguishable from media moved by said document handler;
  - if said scan head observes said backing:
    - moving said media by said scan head using said document handler, while said scan head is stationary; and
    - scanning said media as said media moves by said scan head; and
  - if said scan head does not observe said backing:
    - providing an error notification; and
    - preventing said document handler from moving said media,
  - wherein when attempting to observe said backing, said method further comprises attempting to observe a difference between reflectivity of said backing and reflectivity of said media.

14. The method according to claim 13, wherein when attempting to observe said backing, said method further comprises attempting to observe markings on said backing.

15. The method according to claim 13, wherein if said scan head does not observe said backing, said media on said platen blocks said scan head from scanning media being moved by said document handler.

16. The method according to claim 13, wherein said attempting to observe said backing is performed before said moving of said media by said scan head.

* * * * *